United States Patent Office 3,132,016
Patented May 5, 1964

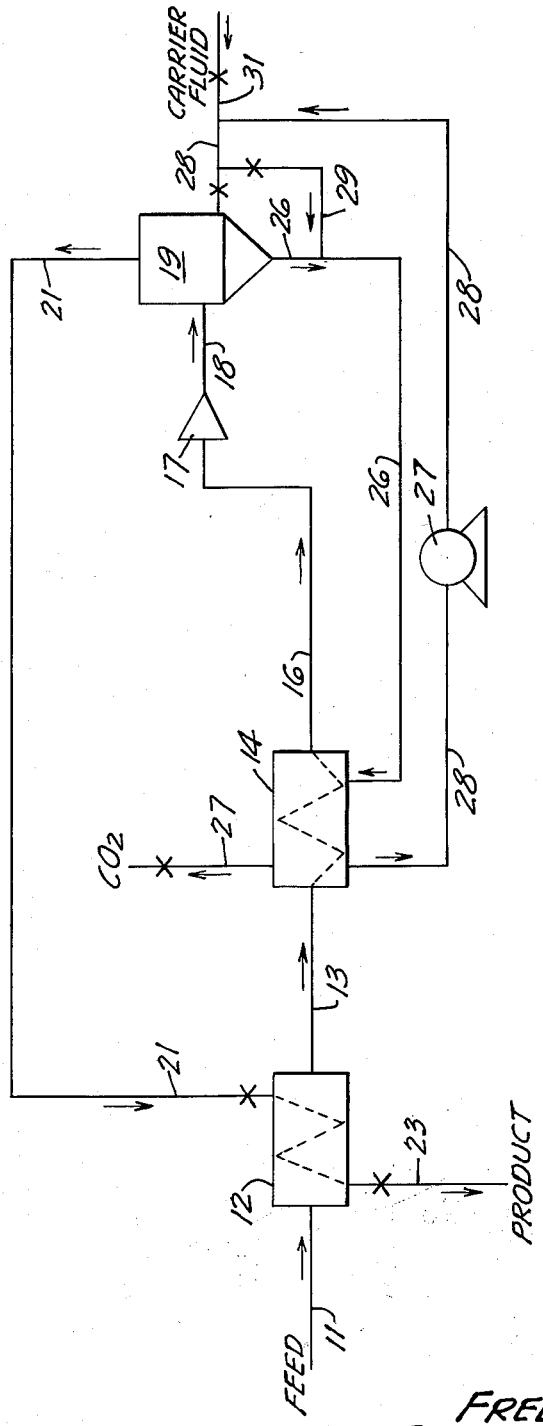

3,132,016
PROCESS FOR THE SEPARATION OF FLUID COMPONENTS FROM MIXTURES THEREOF
Fred Kurata, Lawrence, Kans., assignor to The Kansas University Endowment Association, Lawrence, Kans., a corporation of Kansas
Filed Mar. 9, 1960, Ser. No. 13,857
16 Claims. (Cl. 62—15)

This invention relates to a process for cooling and refrigeration. In one aspect this invention relates to the use of a product stream as a means for cooling in an integrated process for the separation of fluid components from mixtures thereof. In a further aspect this invention relates to the use of a phase change of a solid for cooling other materials. The invention is particularly applicable to processes in which the feed stream thereto must be cooled to a low temperature and thus requires a large amount of refrigeration.

In the separation of normally gaseous acidic components from normally gaseous hydrocarbons, refrigeration is one method used for such separation. In this respect, various normally gaseous hydrocarbon streams contain methane as a principal component and also contain normally acidic components, such as carbon dioxide and hydrogen sulfide, which latter materials must be separated from the gaseous stream in order that the methane or other hydrocarbon will be utilizable as a fuel or as a raw material for conversion to other chemical compounds. These normally gaseous acidic components in many instances are present in substantial proportions, such as above 2 mol percent. One of the best recently developed methods for removing these acidic components is by reducing the temperature of the feed stream such that the acidic components solidify as a separate phase and are then separated as solids from the product of the process. In Patent No. 2,901,326, issued August 25, 1959, and Patent No. 2,900,797, issued August 25, 1959, in which I am a co-inventor with James Paul Kohn, two processes are shown for separating hydrogen sulfide and carbon dioxide, respectively, from normally gaseous hydrocarbon streams by the above method of solidification. These processes require considerable amount of refrigeration and it is much to be desired to find some method for reducing the external refrigeration requirements.

An object of this invention is to provide a process for the refrigeration or cooling.

Another object of this invention is to provide an integrated process for the removal of acidic components from normally gaseous hydrocarbon streams.

It is still another object of this invention to provide a more economical and inexpensive process for the removal of carbon dioxide or hydrogen sulfide or both from methane and reduce the external refrigeration requirements of such a process.

Still another object is to utilize product streams of an integrated process as a means for refrigeration.

Various other objects and advantages of the present invention will become apparent to those skilled in the art from the accompanying description and disclosure.

According to this invention, a fluid stream containing materials which can be separated by solidification is cooled under suitable pressure to form a liquid phase or gaseous phase or both, and a solid phase. The solid phase is then separated from the liquid or gaseous phase or both. The solid phase thus separated is admixed with a carrier medium and the admixture of carrier medium and solid phase is heat exchanged with the incoming fluid feed stream, and the solid phase undergoes a phase change, such as to a liquid or gas phase, thereby absorbing heat from the feed stream, i.e., cooling the feed stream.

In one embodiment of this invention, a gaseous mixture containing a liquefiable material, such as methane, as a principal component and a solidifiable material, such as carbon dioxide, as a minor component is cooled in a cooling step under elevated pressure. The cooled stream is then expanded to reduce the temperature such that the minor component is solidified in finely divided form in admixture with the principal component in the form of vapor or liquid and vapor. The resulting mixture of solid and vapor or solid and liquid together with any gaseous material which may be present as a result of the reduction in pressure is passed to a suitable separation zone where the solid is separated from the vapor or liquid. When applying the present invention to the separation of carbon dioxide from methane, a stream of methane containing dissolved or vaporous carbon dioxide is cooled at a pressure above the three phase locus pressure and a temperature slightly above the three phase locus temperature as shown in the aforesaid Patent No. 2,900,797. This cooled stream is then expanded through an expansion valve or an expansion engine to reduce the pressure and the temperature. At the reduced temperature and pressure there is obtained a vapor phase of methane or a mixture of a liquid phase and a vapor phase of methane containing solidified carbon dioxide. For example, with a 5 mol percent or higher carbon dioxide-containing methane stream, a temperature of $-168°$ F. and a pressure of 250 pounds per square inch absolute after expansion will produce a purified methane vapor containing about 2 mol percent carbon dioxide.

The solid phase, such as carbon dioxide, thus obtained is separated in a conventional separator, such as by cyclone separation or by decantation, from the liquid phase and/or vapor phase. The solid phase is then admixed with a suitable fluid as a carrier medium and then passed to the cooling step and heat exchanged with the incoming fluid stream, whereby the solid phase is vaporized or sublimed and cools the incoming stream. Sufficient cooling is obtained normally by this method such that no external cooling or refrigeration is necessary in the process. In some instances, insufficient cooling may be obtained by this method and some external cooling may be required. On the other hand, in many cases there is excess refrigeration as a result. In any event, the use of the solid for heat exchange materially reduces the external cooling or refrigeration required in such a process. Preferably, in this embodiment of the invention, a separate liquid is used to carry the solid, such as carbon dioxide, from the separator to the cooler, where the latent heat of vaporization or sublimation of the solid cools the feed stream. The liquid carrier medium can carry the solid as a slurry in which the solid is held in suspension in the liquid, or as a solution of solid in the liquid. In the latter case the solid must be soluble in the liquid carrier medium. When the liquid carrying the solid is heat exchanged with the feed stream, vapor is formed which may be vented directly from the cooler or may be passed with the liquid carrier medium to a separator located on the exit conduit from the cooler.

If the liquid carrier medium is admixed with the solid directly inside the separator used for separation of the solid from vapor or liquid product, some solid may vaporize and contaminate the product. This may be minimized or eliminated by removing the solid from the separator mechanically into another chamber. Then the carrier liquid is admixed with the solid in this separate chamber from where it is passed to the cooler.

This proposal, in addition to supplying refrigeration in the purification process, has further advantages. Since the heat transfer medium is a liquid in which solid is in suspension as a slurry or as a solution, the heat transfer coefficient will be high. In fact, the heat transfer coefficient should approach the boiling film coefficient. This will result in a smaller heat transfer surface in the cooler.

The proper carrier liquid for this process must have certain characteristics. Its freezing point must be low enough so that it will not freeze. Its vapor pressure must be such that the loss as vapor will not be excessive, especially when vaporized solid is vented from the cooler.

The liquid carrier medium as previously indicated may be a solvent for the solid phase or it may merely act as a suspension medium. In most instances, the liquid will dissolve a portion of the solid phase and carry the remainder as a slurry. The process as previously indicated has particular applicability to the separation of carbon dioxide from methane, but also is applicable to the separation of hydrogen sulfide from methane when the hydrogen sulfide is separated by solidification in a similar manner as with carbon dioxide.

The particular liquid carrier which will be used will be determined by the temperature in the separator, if the liquid is to be circulated through the separator. This means that the freezing point of the liquid must be lower than the separator temperature. Also, the liquid should not be too viscous at the low temperature.

In case the solid, such as $CO_2$ or $H_2S$, is removed mechanically from the separator and then the liquid carrier is admixed with the solids in a separate chamber, the freezing point of the carrier liquid must be such that it will not freeze when it comes into contact with the solid. If the solid is soluble in the liquid carrier medium, this will depress the freezing point of the carrier liquid.

If the solid impurities are being removed from methane, which is partially liquefied in the separator, the solids must then be separated from the liquid methane before the carrier medium is admixed with the solid.

Typical examples of suitable liquid carrier media useful in the process of this invention for transporting solid carbon dioxide or solid hydrogen sulfide or other similar materials are shown in Table I below.

TABLE I

| Carrier liquid: | Freezing point, °F. |
|---|---|
| Acetone | −138 |
| Isobutane | −255 |
| Normal butane | −217 |
| Isopentane | −256 |
| Normal pentane | −202 |
| 2,2-dimethyl butane | −147 |
| 2,3-dimethyl butane | −199 |
| 2-methyl pentane | −245 |
| 3-methyl pentane | −180 |
| Normal hexane | −139 |
| 2,2-dimethyl pentane | −191 |
| 2,4-dimethyl pentane | −183 |
| 3,3-dimethyl pentane | −211 |
| 2-methyl hexane | −181 |
| 3-methyl hexane | −183 |
| 3-ethyl pentane | −182 |
| Normal heptane | −131 |
| 2,2,4-trimethyl pentane | −161 |
| 2,2,3-trimethyl pentane | −170 |
| 2-methyl heptane | −168 |
| 3,4-dimethyl hexane | −186 |
| 4-methyl heptane | −185 |
| 2,5-dimethyl hexane | −130 |
| 3-methyl octane | −162 |
| Toluene | −139 |
| Methyl cyclohexane | −196 |
| Ethyl benzene | −139 |
| Propyl benzene | −147 |
| Isopropyl benzene | −141 |
| Cyclopentane | −137 |
| Cyclopropane | −197 |

FIGURE 1 of the drawing is a diagrammatic illustration of an arrangement of apparatus suitable for carrying out the process of the present invention for the separation of carbon dioxide from a methane containing feed stream.

According to the drawing, natural gas containing between about 5 and about 30 mol percent carbon dioxide, which has been dehydrated by conventional means, at a pressure of above 715 pounds per square inch absolute, such as 1500 p.s.i.a., and at a temperature of about 90° F. or higher is passed through conduit 11 to cooler 12. In cooler 12 the natural gas stream containing the carbon dioxide is cooled by heat exchange with a stream of cold methane vapor from separator 19. The stream is then passed from cooler 12 through conduit 13 to cooler 14 in which the methane feed stream is heat exchanged with a stream of circulating liquid containing carbon dioxide from conduit 26, as hereinafter described. In cooler 14, the temperature of the natural gas stream is further reduced. The pressure may be somewhat less than the initial pressure of the feed as the result of pressure drop through the system to this point. At this point in process, the temperature and pressure are so controlled that only a single phase containing methane and carbon dioxide exists. The temperature should be maintained sufficiently high in accordance with the existing pressure that carbon dioxide does not solidify at this point in the process.

If sufficient cooling is obtained in cooler 14, cooler 12 may be omitted, without departing from the scope of this invention.

The cooled natural gas stream is then passed from cooler 14 through conduit 16 to an expansion valve or expansion engine 17. In expansion valve 17, for a 2 mol percent concentration of carbon dioxide in the products the pressure is reduced to about 250 p.s.i.a. and the temperature falls to about −168° F. During the expansion in expansion valve 17, carbon dioxide freezes out as fine crystals and is carried over in the expanded stream through conduit 18 to a conventional cyclone separator or decanter 19. In separator 19, finely divided solid carbon dioxide is removed or separated from expanded methane and is withdrawn from the separator 19 through conduit 26.

Vaporous methane is withdrawn from separator 19 through conduit 21. This vaporous stream of methane is heat exchanged with the incoming feed stream in cooler 12 as shown. The vaporous stream in conduit 21 may be removed directly from the process as product without heat exchange with cooler 12, if desired. Methane is removed from cooler 12 through conduit 23, as a product of the process.

Two or more separators may be used parallel in place of the single separator 19 shown. These separators may be operated alternately by switching them on or off the process flow by conventional means (not shown). Time switching valves can make this alternate operation of separators automatic. When operating conditions are such that a substantial amount of liquid methane is formed, separator 19 preferably constitutes a series of two separators whereby liquid is more effectively handled.

Carrier liquid, such as acetone, is introduced into separator 19 through conduit 28 where the solid finely divided carbon dioxide is picked up by the carrier liquid as a slurry or solution and passed through conduit 26 to cooler 14. In cooler 14 the solid carbon dioxide is vaporized or sublimed, thereby absorbing heat from the feed stream in conduit 13. Vaporous carbon dioxide is removed from cooler 14 through conduit 27 for disposal or for use for various known purposes. The introduction of the carrier liquid directly into separator 19 is best utilized when good phase separation between solid and liquid materials is effected therein and where the carrier liquid is immiscible with liquid methane or where all methane in conduit 18 is vaporized by expansion valve 17. Pump 27 is provided for circulating the carrier liquid and solid carbon dioxide to cooler 14 and to separator 19. Pump 27 may be a conventional rotary circulating impeller or the like.

In some instances, it is not desirable to admix the carrier liquid with the contents of separator 19. In such case, the carrier liquid is by-passed from conduit 28 through conduit 29 to outlet conduit 26 where the carrier liquid picks up the solid carbon dioxide and circulates the solid carbon dioxide as a slurry or a solution to cooler 14. It is also within the scope of this invention to provide an additional separator (not shown) in conduit 26 where the solid carbon dioxide is substantially completely separated from methane and the carrier liquid is admixed with the solid carbon dioxide therein, such as from conduit 29. Conduit 31 is provided for introducing fresh or make-up carrier medium into the system.

In some instances, liquid methane itself may be utilized as the carrier liquid. However, in such an instance, the amount of liquid methane used will be lost as a product of the process and will be removed from the system with the carbon dioxide through conduit 27. Whether or not a slurry of liquid methane and carbon dioxide can be used in this system by passage thereof through conduit 26 to cooler 12 will depend upon the economics of such use.

Preferably, the volume ratio of carrier medium to solids is between about 1:4 and about 10:1, but the actual amount of carrier medium will depend on various factors, such as the solubility of the solids in the carrier medium and the circulating velocity and carrying capacity of the carrier medium.

The inlet temperature of the feed stream to separator 19 and the amount of expansion required in expansion valve 17 will depend upon the initial carbon dioxide content of the feed gas. For example, a methane feed gas containing 10 mol percent carbon dioxide will require a temperature of not higher than $-57°$ F. before expansion valve 17. Similarly, the temperature and pressure conditions of separator 19 will depend upon the ultimate desired carbon dioxide content of the product methane. If a 2 percent carbon dioxide content in the methane product is tolerable, the separator temperature is about $-168°$ F. and the pressure is about 250 pounds per square inch absolute.

As another embodiment of the present invention, the use of solid material for cooling the inlet feed stream may be applied to a system for removing hydrogen sulfide from methane such as disclosed in detail in the aforesaid Patent No. 2,901,326 in which I am a co-inventor with James Paul Kohn. This system operates similarly to the system described with regard to the drawing. In this system for removing hydrogen sulfide, a phase separator is usually provided after an expansion valve for separating liquid methane from a liquid hydrogen sulfide rich phase. The liquid methane is then expanded further to remove the remaining hydrogen sulfide as a solid in a manner substantially the same as that described in the drawing herein. A suitable liquid carrier medium is provided to pass the solid hydrogen sulfide from the separator to the cooling step where the solid hydrogen sulfide is vaporized or sublimed. The vaporization or sublimization of the solid hydrogen sulfide cools the inlet feed stream to the desired temperature. As a result, little, if any, external refrigeration is necessary. In this system using solid hydrogen sulfide, liquid methane may also be used as a carrier medium depending upon the economics of the process. Substantially all of the previous description of the present invention as to carbon dioxide with the exception of the actual operating conditions applies to the use of solid hydrogen sulfide for refrigeration purposes.

It is to be noted further that it is not necessary that the solid carbon dioxide or solid hydrogen sulfide be vaporized or sublimed, but these solid materials may be liquefied. The phase change from solid to liquid or from solid to vapor provides the cooling by absorption of heat from the feed stream. In case the solid $CO_2$ or $H_2S$ is liquefied rather than vaporized, liquid $CO_2$ or $H_2S$ will usually be immiscible with the carrier medium and, therefore, can be easily separable therefrom.

*Example*

The following Table II shows operating conditions of temperature, pressure and quantity of materials for various carbon dioxide contents of the methane feed stream for the process of this invention carried out in accordance with the drawing. The carbon dioxide content of the feed is varied from 5 to 30 mol percent and the through put is constant at 98,000,000 cubic feet per day of methane. "T" in the table refers to temperature, "P" to pressure, and "S" to quantity of material. The subscripts on "T," "P" and "S" refer to the conduit or vessel to which the conditions are applicable.

TABLE II

| Mol Percent | $T_{11}$, °F. | $P_{11}$, p.s.i.a. | $T_{13}$, °F. | $T_{23}$, °F. | $T_{27}$, °F. | $T_{16}$, °F. | $P_{19}$, p.s.i.a. | $T_{19}$, °F. | $S_{11}$, million s.c.f./d. | $S_{23}$, million s.c.f./d. | $S_{27}$, mil.lb./day | $S_{16}$, million ft.³/day |
|---|---|---|---|---|---|---|---|---|---|---|---|---|
| $CO_2$ in Feed: | | | | | | | | | | | | |
| 5 | 90 | 1,500 | −20 | 5 | −110 | −40 | 250 | −168 | $CH_4$:98 / $CO_2$:5.2 | $CH_4$:98 / $CO_2$:2 | 0.37 | 0.033 to 0.00097 |
| 10 | 90 | 1,500 | −10 | −10 | −110 | −57 | 250 | −168 | $CH_4$:98 / $CO_2$:10.9 | $CH_4$:98 / $CO_2$:2 | 1.03 | 0.11 to 0.0027 |
| 20 | 90 | 1,500 | 25 | −55 | −110 | −82 | 250 | −168 | $CH_4$:98 / $CO_2$:24.5 | $CH_4$:98 / $CO_2$:2 | 2.61 | 0.274 to 0.0069 |
| 30 | 90 | 1,500 | 70 | −105 | −110 | −107 | 250 | −168 | $CH_4$:98 / $CO_2$:42 | $CH_4$:98 / $CO_2$:2 | 4.64 | 0.49 to 0.012 |

Where more than 30 mol percent carbon dioxide is contained in the feed and no more than 2 mol percent carbon dioxide can be tolerated in the product, carbon dioxide will solidify in cooler 14 and interfere with the operation of the process. In such circumstances, a portion of the methane product from conduit 21 or 23 is recycled to the feed in conduit 11 to lower the carbon dioxide content to 30 mol percent or lower. Since the material in conduit 21 or 23 is at a lower pressure than that material in conduit 11, this recycle must be repressured by a conventional compressor.

Although the present invention has been described primarily with regard to the purification of methane by removal of carbon dioxide or hydrogen sulfide as solids, the present invention applies to various systems where a normally gaseous component is removed by solidification from a feed stream to be purified. So long as there is a phase change of the solid impurity or by-product, the solid will serve as a refrigerant. Various modifications and alterations of the steps and the temperature and pressure conditions as well as liquid carrier medium may become obvious to those skilled in the art without departing from the scope and teachings of this invention.

Having described my invention, I claim:

1. In a process for the removal of a component from a fluid stream containing at least two components at least one of which is a gaseous component and in which the gaseous component is removed as a solid by cooling the feed stream in a cooling step, the improvement which comprises separating said solid from the fluids present after said cooling step, admixing the solid thus recovered with a liquid carrier medium, and passing said solid and carrier medium in admixture to said cooling step of the process, and causing a phase change of the solid for return to the gaseous state thereby absorbing heat from the feed stream, and separating the gaseous phase from the liquid carrier.

2. In a process for the removal of a component from a fluid stream containing at least two components in which one of the components is removed as a solid, comprising in a cooling step cooling said fluid stream under an elevated pressure sufficient to form a liquid phase and a solid phase and separating said liquid phase from said solid phase and recovering the liquid phase as a product of the process, the improvement which comprises admixing the solid phase thus separated from the liquid phase with a liquid carrier medium, and passing said solid phase and carrier medium to said cooling step of the process and indirectly heat exchanging the solid phase and carrier medium with the fluid stream therein whereby the solid phase is vaporized and the fluid stream is cooled.

3. The process of claim 2 in which said fluid stream is a stream containing methane as the principal component and carbon dioxide as a minor component and said liquid phase is a methane rich phase and said solid phase comprises carbon dioxide.

4. The process of claim 2 in which said fluid stream is a stream containing methane as the principal component and hydrogen sulfide as a minor component and said liquid phase is a methane rich phase and said solid phase comprises hydrogen sulfide.

5. The process of claim 2 in which said liquid carrier medium is an organic compound having a freezing point not higher than about $-138°$ F.

6. The process of claim 5 in which said carrier medium is acetone.

7. The process of claim 5 in which said carrier medium is a hydrocarbon.

8. The process of claim 2 in which the volume ratio of carrier medium to solids is between about 1:4 and about 10:1.

9. A process for the separation of carbon dioxide and methane which comprises in a cooling step cooling a feed stream of methane containing above 5 mol percent carbon dioxide while maintaining a pressure and temperature such that carbon dioxide does not solidify as a separate phase, expanding the cooled methane stream to reduce the pressure to not higher than about 250 p.s.i.a. and the temperature to not higher than about $-168°$ F. to precipitate solid carbon dioxide from expanded methane, separating solid carbon dioxide from expanded methane, mixing said solid carbon dioxide with a liquid carrier medium, indirectly heat exchanging said carrier medium containing solid carbon dioxide in said cooling step with said feed stream of methane to cool same and recovering a purified methane product stream containing about 2 mol percent carbon dioxide.

10. The process of claim 9 in which said carrier medium is acetone.

11. The process of claim 9 in which said product stream of methane is recycled and admixed with the feed stream to maintain the carbon dioxide content of the combined stream not higher than 30 mol percent.

12. A process for the separation of carbon dioxide and methane which comprises in a cooling step cooling a feed stream of methane containing above about 5 mol percent carbon dioxide while maintaining a temperature and pressure such that none of the carbon dioxide solidifies as a separate phase, expanding the cooled methane stream to reduce the pressure to not higher than about 250 p.s.i.a. and the temperature to not higher than about $-168°$ F. to precipitate a solid carbon dioxide from expanded methane, separating solid carbon dioxide from expanded methane in a separation zone, admixing said solid carbon dioxide with a liquid carrier medium in said separation zone, indirectly heat exchanging said carrier medium containing solid carbon dioxide in said cooling step with said feed stream of methane to cool said stream of methane and vaporize said solid carbon dioxide, separating vaporized carbon dioxide from carrier medium, returning said carrier medium from said cooling step to said separation zone, and recovering a purified methane product stream containing not more than 2 mol percent carbon dioxide.

13. The process of claim 12 in which the volume ratio of carrier medium to solids is between about 1:4 and about 10:1.

14. A process for the separation of hydrogen sulfide and a normally gaseous hydrocarbon from a mixture containing same which comprises cooling in a cooling step a mixture containing methane and hydrogen sulfide while at an elevated pressure and at a temperature sufficiently low to form two liquid phases, one of said liquid phases being rich in methane and containing a minor amount of hydrogen sulfide and the other of said liquid phases being a hydrogen sulfide rich phase, expanding said liquid methane rich phase to reduce the temperature sufficiently low such that solid hydrogen sulfide is formed, separating solid hydrogen sulfide from expanded methane, recovering said expanded methane as a product of the process, mixing said solid hydrogen sulfide with a liquid carrier medium, and indirectly heat exchanging said carrier medium containing said solid hydrogen sulfide with the incoming stream of methane in said cooling step to cool said methane stream.

15. A process for the separation of hydrogen sulfide and a normally gaseous hydrocarbon from a mixture containing same which comprises cooling in a cooling step a mixture containing methane and hydrogen sulfide in an amount above 6 mol percent, while at a pressure of at least 450 pounds per square inch absolute, at a temperature sufficiently low to form two liquid phases, one of said liquid phases being rich in methane and containing between about 6 and about 7.5 mol percent hydrogen sulfide and the other of said liquid phases containing about 90 mol percent hydrogen sulfide, expanding said liquid methane rich phase to reduce the temperature sufficiently low such that vaporous methane and solid hydrogen sulfide is formed, separating solid hydrogen sulfide from expanded methane in a separation zone, recovering said expanded methane as a product of the process, admixing said solid hydrogen sulfide with a liquid carrier medium in said separation zone, indirectly heat exchanging said carrier medium containing said solid hydrogen sulfide with the incoming stream of methane in said cooling step to cool said methane stream and vaporize said hydrogen sulfide, separating vaporized hydrogen sulfide from said liquid carrier medium, and returning said separated liquid carrier medium to said separation zone.

16. The process of claim 15 in which said liquid carrier medium is acetone.

References Cited in the file of this patent

UNITED STATES PATENTS

| | | |
|---|---|---|
| 1,586,029 | Cremieu | May 25, 1926 |
| 2,209,534 | Moore | July 30, 1940 |
| 2,261,808 | Morris | Nov. 4, 1941 |
| 2,528,028 | Barry | Oct. 31, 1950 |
| 2,772,545 | Shanley | Dec. 4, 1956 |
| 2,784,572 | Wucherer | Mar. 12, 1957 |

(Other references on following page)

UNITED STATES PATENTS

| | | |
|---|---|---|
| 2,873,583 | Pott et al. | Feb. 17, 1959 |
| 2,900,797 | Kurata et al. | Aug. 25, 1959 |
| 2,901,326 | Kurata | Aug. 25, 1959 |
| 2,951,351 | Snelling | Sept. 6, 1960 |
| 2,968,160 | Schilling | Jan. 17, 1961 |
| 2,997,854 | Schilling | Aug. 29, 1961 |
| 3,074,245 | Becker | Jan. 22, 1963 |

FOREIGN PATENTS

| | | |
|---|---|---|
| 214,264 | Germany | Oct. 9, 1909 |
| 564,428 | Germany | Nov. 18, 1932 |
| 67,949 | Norway | June 19, 1944 |
| 568,292 | Great Britain | Mar. 28, 1945 |
| 1,044,127 | Germany | Nov. 20, 1958 |